(12) United States Patent
Guthrie et al.

(10) Patent No.: US 7,970,272 B2
(45) Date of Patent: *Jun. 28, 2011

(54) METHOD AND APPARATUS FOR POWER MANAGEMENT IN AN ELECTRONIC DEVICE

(75) Inventors: Martin Guthrie, Moffat (CA);
Christopher Book, Waterloo (CA);
Lyall Winger, Waterloo (CA)

(73) Assignee: Research In Motion Limited, Waterloo, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 12/568,803

(22) Filed: Sep. 29, 2009

(65) Prior Publication Data
US 2010/0014848 A1 Jan. 21, 2010

Related U.S. Application Data

(63) Continuation of application No. 11/501,902, filed on Aug. 10, 2006, now Pat. No. 7,616,882.

(51) Int. Cl.
*G03B 7/26* (2006.01)
(52) U.S. Cl. .................. 396/205; 396/301
(58) Field of Classification Search .......... 396/205, 396/301–304; 348/333.13, 372, 333.12
See application file for complete search history.

(56) References Cited

U.S. PATENT DOCUMENTS

| | | | |
|---|---|---|---|
| 4,290,677 A | 9/1981 | Baumeister | |
| 5,461,288 A * | 10/1995 | Chaves et al. | 315/241 P |
| 5,652,502 A | 7/1997 | van Phuoc et al. | |
| 5,845,142 A | 12/1998 | Hayasaka | |
| 5,963,255 A * | 10/1999 | Anderson et al. | 348/372 |
| 6,233,016 B1 * | 5/2001 | Anderson et al. | 348/372 |
| 6,271,634 B1 | 8/2001 | Saiger | |
| 6,701,442 B1 | 3/2004 | Kunz et al. | |

(Continued)

FOREIGN PATENT DOCUMENTS

CN 1543195 11/2004

(Continued)

OTHER PUBLICATIONS

Mayo, Robert N., et al., "Energy Consumption in Mobile Devices: Why Future Systems Need Requirements—Aware Energy Scale-Down" (Aug. 12, 2003), online: <http://www.hpl.hp.com/techreports/2003/HPL-2003-167.pdf>.

(Continued)

*Primary Examiner* — Christopher E Mahoney
*Assistant Examiner* — Warren K Fenwick
(74) *Attorney, Agent, or Firm* — Perry+Currier Inc.

(57) ABSTRACT

An electronic device and method for power management in an electronic device is provided. In an embodiment, the electronic device includes the functionality of a personal digital assistant, wireless email paging and a camera with a flash that is operated via self-contained power supply in the form of a battery. The device also includes a supervisor circuit which causes the device to enter sleep mode, or disables the device or certain features of the device, if the battery level falls below a certain threshold. A method in accordance with an embodiment performs, in response to a request to fire the flash, a pre-flash test which is selected so as to not trip the supervisor circuit. The battery level is examined after the pre-flash test. If the battery level meets certain criteria, the full flash is permitted to proceed, else the full flash is not permitted to proceed.

25 Claims, 8 Drawing Sheets

U.S. PATENT DOCUMENTS

| | | | |
|---|---|---|---|
| 6,735,706 | B2 | 5/2004 | Tomlinson et al. |
| 6,973,432 | B1 | 12/2005 | Woodard et al. |
| 7,152,168 | B2 * | 12/2006 | Boynton et al. ............. 713/300 |
| 7,355,649 | B2 | 4/2008 | Takai |
| 7,616,882 | B2 * | 11/2009 | Guthrie et al. ............... 396/205 |
| 2003/0083024 | A1 * | 5/2003 | Richenstein et al. ........... 455/99 |
| 2005/0052446 | A1 | 3/2005 | Plut |
| 2005/0057487 | A1 | 3/2005 | Takata et al. |
| 2005/0289360 | A1 | 12/2005 | Banginwar et al. |
| 2006/0101293 | A1 | 5/2006 | Chandley et al. |
| 2007/0126729 | A1 | 6/2007 | Yoon et al. |
| 2007/0146344 | A1 | 6/2007 | Martin et al. |
| 2008/0204374 | A1 | 8/2008 | Weitbruch et al. |

FOREIGN PATENT DOCUMENTS

| | | | |
|---|---|---|---|
| EP | | 1308921 A2 | 5/2003 |

OTHER PUBLICATIONS

Blackle.com, <http://www.blackle.com/>.

Techchee.com, IPhone 4G to get Super AMOLED display, downloaded <http://www.techchee.com/2010/02/18/iphone-4g-to-get-super-amoled-display/>.

CMEL by GLYN High-Tech Distribution, Guides for AMOLED User Interface Design, <http://www.aug-electronics.com/LinkClick.aspx?fileticket=IxtzmA8BS24%3D&tabid=155&mid=603>.

Marco.org, Subpixel considerations for AMOLED screens,< http://www.marco.org/352146450>.

Wei-Chung Cheng and Massoud Pedram: Concurrent Brightness and Contrast Scaling for Minimizing Power Consumption of an AMOLED Display.

European Patent Application No. EP 10 17 5977 Search Report mailed Nov. 26, 2010.

* cited by examiner

METHOD AND APPARATUS FOR POWER MANAGEMENT IN AN ELECTRONIC DEVICE

CROSS-REFERENCE TO RELATED APPLICATION

This application is a continuation of U.S. patent application Ser. No. 11/501,902, filed Aug. 10, 2006, entitled "Method and Apparatus for Power Management in an Electronic Device", the contents of which are incorporated herein by reference.

FIELD

The present application relates generally to electronic devices and more particularly relates to a method and electronic device for power management in an electronic device, such as a multi-function portable electronic device that includes a camera flash or the like.

BACKGROUND

Electronic devices continue to get smaller and incorporate more functions. It is well known to incorporate the functions of a traditional personal digital assistant ("PDA") with wireless email capability into a single device, the Blackberry™ from Research in Motion of Waterloo, Canada being an example of such a device. It is also known to incorporate wireless voice functionality, music and video players into such devices. Increasingly, cameras are being incorporated into such devices.

With integration, so too comes increased device complexity. Power management in the device needs to reflect that complexity. For example, due to the portable nature of these devices, a robust rechargeable battery is desirable, if not a necessity, to satisfy user demands. However, even with a robust rechargeable battery, sophisticated power management techniques are needed to optimize battery use.

However, power management In such devices still needs much improvement. One particular vexing problem is the camera flash. When the battery is low, or cold, the battery ESR may be too high to support a camera flash. The camera flash is a high drain on the battery for a long period of time. It is not uncommon for a camera flash to draw up to about one ampere (Amp) of power from the battery for up to about eighty milliseconds (ms). This draw can cause battery "droop". In such cases the battery droop may be such to trip battery supervisory circuits, causing the handset to reset or go into sleep mode. This can be a frustrating experience for the user.

One approach to try and address this problem is to map known levels of battery capacity and voltage into tables that are associated with events that should occur at those battery capacity levels. This can be an effective approach for components that draw relatively small or steady amounts of power. However, for a flash or other high-intensity component, a large margin of battery reserve is needed as the momentary conditions of a battery that can withstand such a high-intensity burst can vary. Accordingly this approach is not a satisfactory option for at least some situations.

BRIEF DESCRIPTION OF THE DRAWINGS

Embodiments, which are purely exemplary, will now be discussed with reference to the attached Figures in which.

DETAILED DESCRIPTION OF THE EMBODIMENTS

Figure 1:
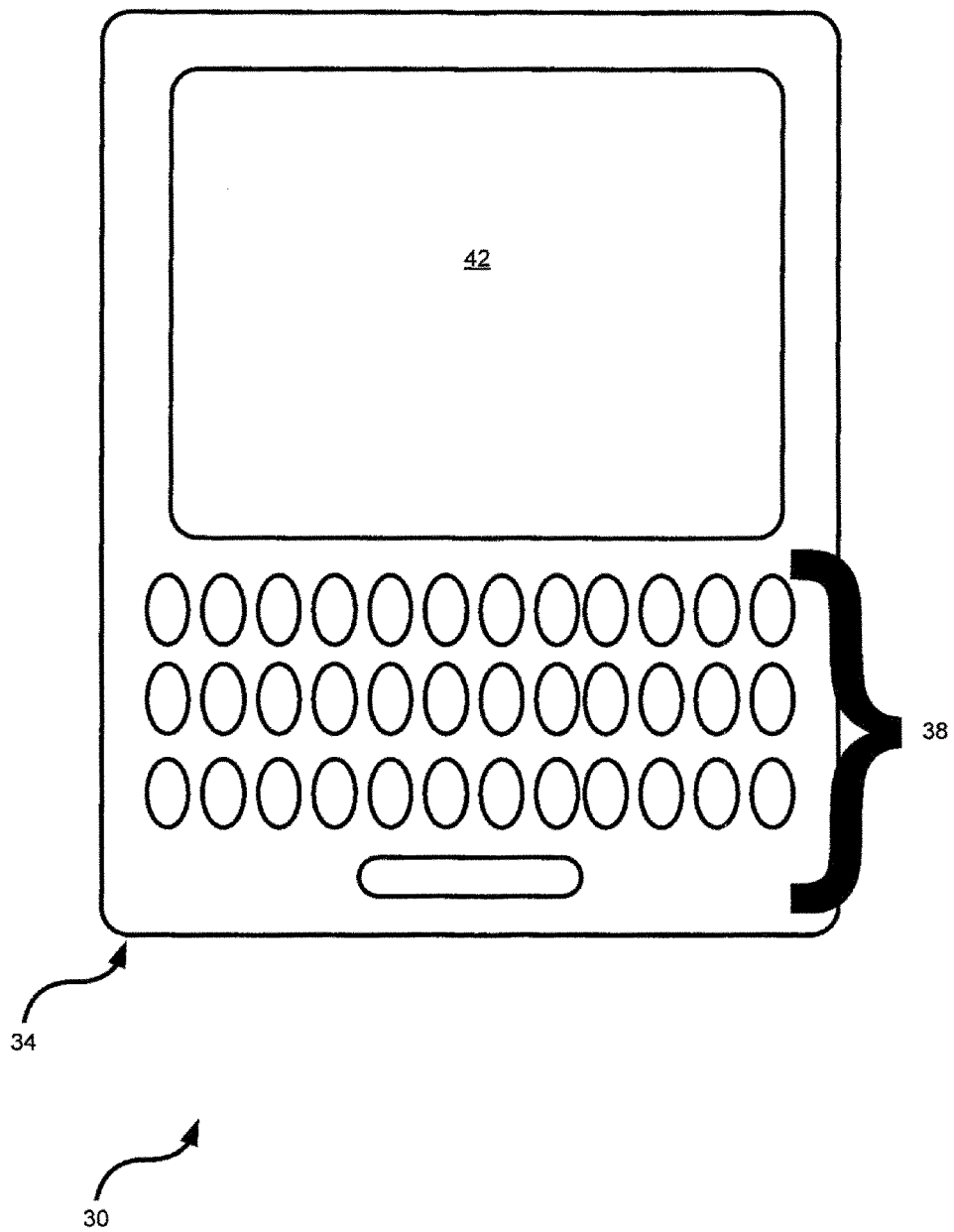
FIG. 1 is a front view of an electronic device in accordance with an embodiment.

An aspect provides a method of power management in an electronic device having a supervisor circuit for disabling all or a portion of functions of the device if a first level of power to the device falls below a predefined threshold, the method comprising:

receiving a request for a function to be performed by the electronic device;

determining a second level of power to said device;

performing a pre-function test; the prefunction test based on the function and selected to consume fewer power resources than the function and also selected to not to fall below the predefined threshold;

determining a third level of power to the device as a consequence of performing the pre-function test; and, if a difference between said second level of power and said third level of power meets a predefined criterion, preventing the device from performing the function and otherwise permitting the device to perform the function.

The function can be a camera flash. The flash can be activated according to the function for a period of about eighty milliseconds and can draw power of about one ampere. The flash can be activated according to the pre-function test for a period of about two milliseconds during which it can draw power of about one ampere.

In conjunction with preventing the device from performing the function, the method can generate an output signal from the device, such as on the display of the device or an audio signal, which indicates that there Is insufficient power to perform the function.

The power to the device can be provided via a rechargeable battery, such as lithium battery, that is housed within the electronic device.

At least one of the first level of power, the second level of power, or the third level of power can be measured using one or more of battery voltage, battery amperage, battery equivalent series resistance, and battery temperature.

The method can further comprising the step of measuring a plurality of additional levels of power throughout the performance of the pre-function test. The predefined criterion can be based on changes within the additional levels of power.

The method can further comprising the step of, after preventing the device from performing the function, permitting the device to perform an alternative function that consumes less power than the function. If the function is a camera flash used at full power then the alternative function can be the camera flash used at less than full power. The alternative function can be chosen to consume another level of power that is greater than the predetermined threshold and differs from the predetermined threshold by a value that approaches zero.

In other words the third level of power can be chosen to maximize the amount of power available to the alternative function, but without crossing the predetermined threshold.

Another aspect provides an electronic device comprising a power supply and a supervisor circuit connected to the power supply for disabling all or a portion of functions of the electronic device if a first level of power from the power supply falls below a predefined threshold. The electronic device also includes a processor connected to the power supply and to the supervisor circuit. The processor is configured to receive a request via an input device for a function to be performed by the electronic device. The electronic device also includes an output device connected to the power supply, the processor, and the supervisor circuit. The output device is configured to perform a function that draws power from the power supply. The processor is also configured to measure a second level of power from said power supply and then perform a pre-function test. The pre-function test is based on the function and selected to consume fewer power resources than the function and also selected to not to fall below the predefined threshold. The processor is further configured to determine a third level of power drawn from the power supply as a consequence of performing the pre-function test. The processor is further configured to (if a difference between the second level of power and the third level of power meets a predefined criterion) prevent the output device from performing the function and otherwise permitting the output device to perform the function.

The output device can be a camera flash. The flash can be activated according to the function for a period of about eighty milliseconds and draws power of about one ampere. The flash can be activated according to the pre-function test for a period of about two milliseconds so as to draw power of about one ampere.

In conjunction with preventing the electronic device from performing the function, the processor can be operable to generate an output signal indicating that there is insufficient power to perform the function.

The power supply can be a rechargeable battery housed within the electronic device.

At least one of the first level of power, the second level of power, or the third level of power can be measured using one or more of battery voltage, battery amperage, battery equivalent series resistance, and battery temperature.

The processor can be configured to measure a plurality of additional power levels throughout the performance of the pre-function test. The predefined criterion can be based on changes within said additional levels of power.

The processor can be further configured to, after preventing the electronic device from performing the function, permitting the output device to perform an alternative function that consumes less power than the function.

Where the function is a camera flash used at full power, the alternative function can be the camera flash used at less than full power.

The alternative function can be chosen to consume another level of power that can be greater than the predetermined threshold and differs from the predetermined threshold by a value that approaches zero.

Another aspect provides an electronic device comprising a power supply and a supervisor circuit connected to the power supply for disabling all or a portion of functions of the electronic device if a first level of power from the power supply falls below a predefined threshold. The electronic device also includes a radio, the supervisor circuit configured to disable the radio when the power supply falls below about 3.4 Volts for at least about five milliseconds. The electronic device also includes a processor connected to the power supply and the supervisor circuit. The processor configured to receive a request via an input device for a function to be performed by the electronic device. The electronic device also includes an output device connected to the power supply, the processor, and the supervisor circuit. The output device configured to perform a function that draws power from the power supply. The processor being configured to perform the step of performing a pre-function test. The pre-function test based on the function and selected to consume less power than the function and also selected to not cause the first level of power to fall below the predefined threshold. The processor also being configured to perform the step of determining a second level of power to the device as a consequence of performing the pre-function test. If the second level of power meets at least one predefined criterion, the processor also being configured to prevent the device from performing the function or otherwise permitting the device to perform the function.

The output device can be a camera flash. The processor can be configured to activate the flash according to the function for a period of about eighty milliseconds and draws current of about one ampere; and the processor can be configured to activate the flash according to the pre-function test for a period of about two milliseconds and draws current of about one ampere.

In conjunction with preventing the device from performing the function, the device can be configured to generate an output signal indicating that there is insufficient power to perform the function.

The electronic device can have a rechargeable battery housed within the electronic device for providing power.

The processor can be configured to measure the first level and the second level of power using one or more of battery voltage, battery amperage, battery equivalent series resistance, and battery temperature.

The processor can be configured to measure the battery level before and/or after performing the pre-function test and/or throughout the performance of the pre-function test.

The processor can be configured to measure the battery level once before and once after performing the pre-function test.

The processor can be configured to capture a time varying profile of one or more parameters indicative of battery level during the performance of the pre-function test.

The processor can be further configured to, after preventing the electronic device from performing the function, permit the output device to perform an alternative function that consumes less power than the function. The function can be a camera flash used at full power and the alternative function can be the camera flash used at less than full power. The alternative function can be configured to consume a third level of power that can be selected so as not to cause the first level of power to fall below the predefined threshold.

The supervisor circuit can be configured to enter the electronic device into a sleep mode when the power supply falls below about 3.1 Volts for at least about three milliseconds.

The processor can be configured to use an average of a plurality of time varying profiles of one or more parameters indicative of battery level during the performance of the pre-function test.

Referring now to FIG. 1, a front view of electronic device in accordance with an embodiment is indicated generally at 30. Device 30 includes a housing 34 that frames an input device in the form of a keyboard 38 and an output device in the form of a display 42. In a present embodiment, device 30 includes at least the functionality of a wireless email paging device and a user of device 30 can interact with keyboard 38 and display 42 to send and receive email messages. It is to be understood that device 30 is simplified for purposes of explanation, and that in other embodiments device 30 can include, and typically would include additional functionality and include input and output devices accordingly. Such other functionality can include voice telephony, music player, audio recording, and video player. Thus, other input devices can Include microphones, and other output devices can include speakers. Device 30 can also be equipped with Bluetooth™ (or equivalent technology) which acts as a wireless conduit for such input and output device. In general, it should be understood that device 30 can include any combination of functions.

Figure 2:
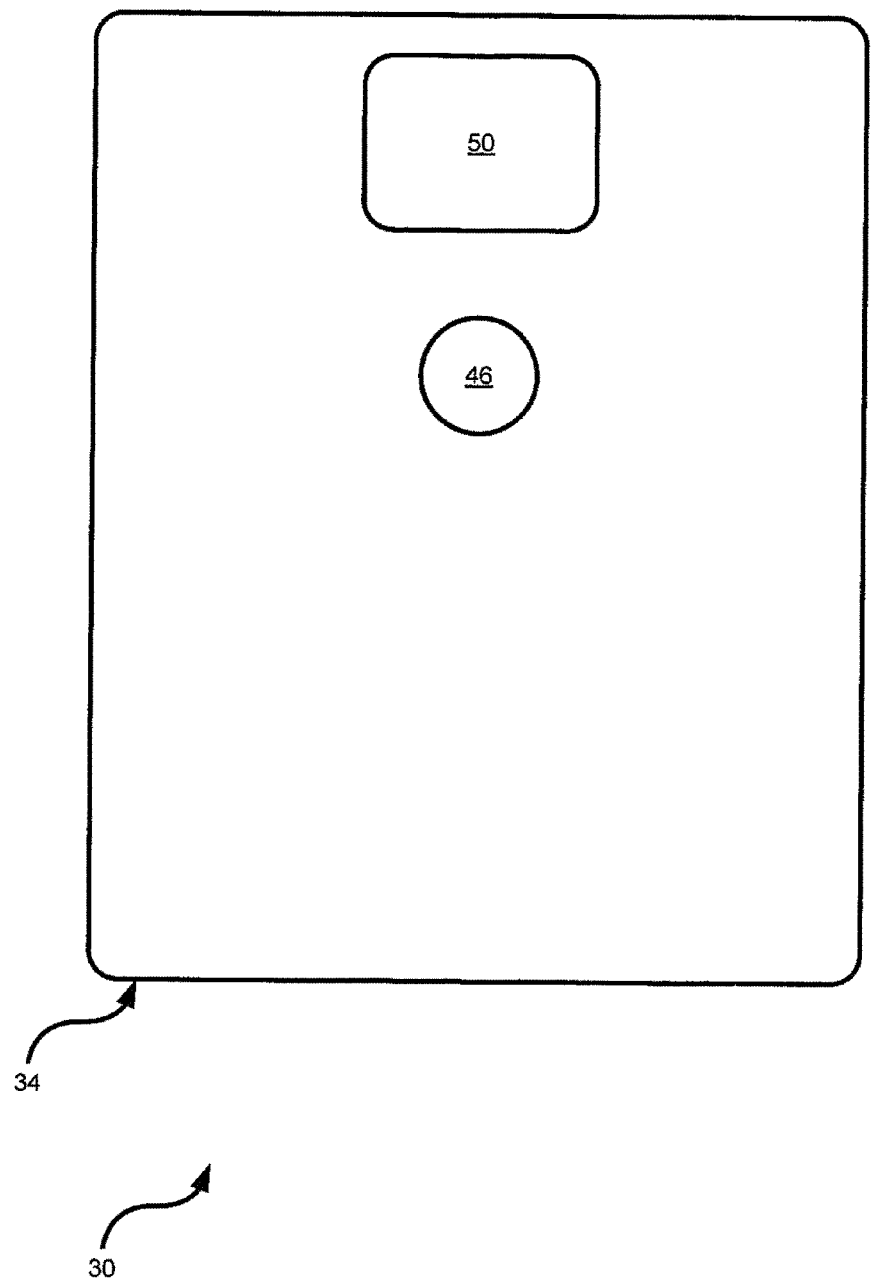
FIG. 2 is a rear view of the device of FIG. 1.

In a present embodiment, device 30 also includes a camera. Referring now to FIG. 2, a rear view of device 30 is shown. Device 30 thus also includes an additional input device in the form of a camera lens 46 and an additional output device in the form of a flash 50. Those skilled in the art will recognize that lens 46 is also associated with an array of light-sensitive transducers such as an array of charge coupled devices (CCD) which actually create an electronic signal of the image captured via lens 46.

Figure 3:
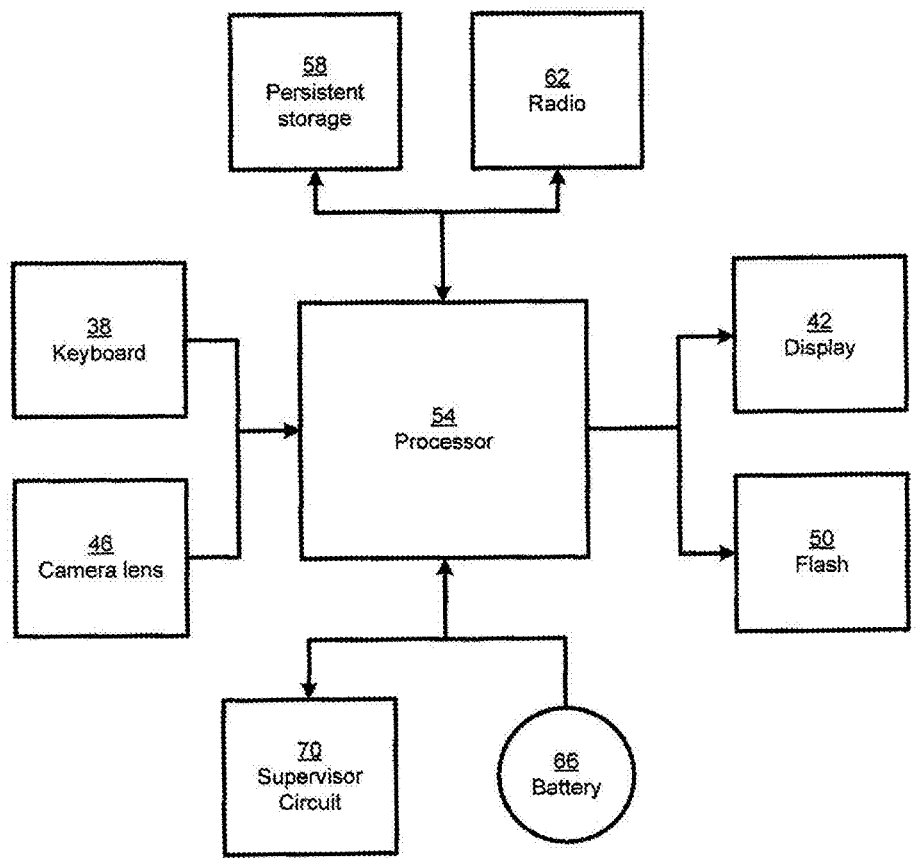
FIG. 3 is a block diagram of certain internal components of the device of FIG. 1.

Referring now to FIG. 3, a block diagram representing the internal components of device 30 is shown. Device 30 thus includes a processor 54 which interconnects the input devices of device 30 (i.e. keyboard 38 and camera lens 46) and the output devices of device 30 (i.e. display 42 and flash 50). Processor 54 is also connected to a persistent storage device 58. (Persistent storage device 58 can be implemented using flash memory or the like, and/or can include other programmable read only memory ("PROM") technology and/or can include read only memory ("ROM") technology.) Device 30 also includes a wireless radio 62 disposed within housing 34 that connects wirelessly to one of a network of base stations to provide the wireless email functionality of device 30.

Device 30 also includes a battery 66 which is typically rechargeable and provides power to the components of device 30. In a present, purely exemplary embodiment, battery 66 is a lithium battery having an operating voltage of between about 3.0 Volts minimum to about 4.2 Volts maximum. In FIG. 3, for simplicity battery 66 is only shown connected to processor 54, but it will be understood that battery 66 is connected to any component (e.g. the CCD associated lens 46, radio 62, display 42 and flash 50) within device 30 that needs power to operate.

Those skilled in the art will now recognize that flash 50 is a high-intensity component that can cause significant battery drain. As an example, for device 30 it will be assumed that flash 50 draws about one ampere of power for about eighty milliseconds during a single picture-taking flash.

Device 30 also includes a supervisor circuit 70 that is connected to battery 66 and processor 54. Supervisor circuit 70 is operable to monitor the life of battery 66 and depending on the life of battery 66, supervisor circuit 70 can disable various components that draw power and/or cause device 30 to enter sleep mode and/or turn-off device 30 altogether. Supervisor circuit 70 is shown as a separate hardware component within device 30, but it should be understood that can simply be implemented as a software process that executes on processor 54. (As a still further alternative to the present embodiment, supervisor circuit 70 can be implemented as part of a larger analog power-management integrated circuit, such as the TPS65800 power management integrated circuit ("PMIC") from Texas Instruments Incorporated, 12500 TI Boulevard, Dallas, Tex. 75243-4136.) For example, if supervisor circuit 70 determined that the life of battery 66 was below a certain predefined threshold, then supervisor circuit 70 may disable radio 62 and thereby permit device 30 to continue its other functions even though the send-and-receive capability of the wireless email function is disabled. As another example, if supervisor circuit 70 determined that the life of battery 66 was nearly drained, then supervisor circuit 70 can cause device 30 to turn off altogether, but still ensure that enough power remains in battery 66 to ensure that data is not lost in processor 54 and/or persistent storage 58.

Supervisor circuit 70 can include a variety of parameters associated with the predefined threshold. For purposes of explaining the present embodiment, Table I gives an example of parameters that can be associated with battery 66, where battery 66 is a lithium battery with the characteristics as described above.

TABLE I

| Parameters of Supervisor Circuit 70 | | | |
| --- | --- | --- | --- |
| Event Number | Voltage Threshold (Volts) | Duration (milliseconds) | Event |
| 1 | 3.4 Volts | five ms | Disable radio 62 |
| 2 | 3.1 Volts | three ms | Enter sleep mode |

In Table I, two exemplary parameters are shown. The first column, event number, is simply a label for a particular set of parameters. The second column, voltage threshold, defines a certain voltage level below which an event associated with the event number may be triggered. The third column, duration, defines a time period whereby if the voltage of battery 66 in the second column falls below the voltage level in the second column for the duration in the third column, then the event in the fourth column will be triggered.

For example, in event number one, if the voltage of battery 66 drops below 3.4 Volts for five milliseconds, then supervisor circuit 70 will disable radio 62. Likewise, in event number two, if the voltage of battery 66 drops below 3.1 volts for three milliseconds, then supervisor circuit 70 will cause device 30 to enter sleep mode.

It is to be understood that the parameters in Table I are exemplary. Other parameters may be included, such as a measurement for equivalent series resistance ("ESR"). Complex formulas may also be associated with each parameter before a particular event is triggered.

Figure 4:
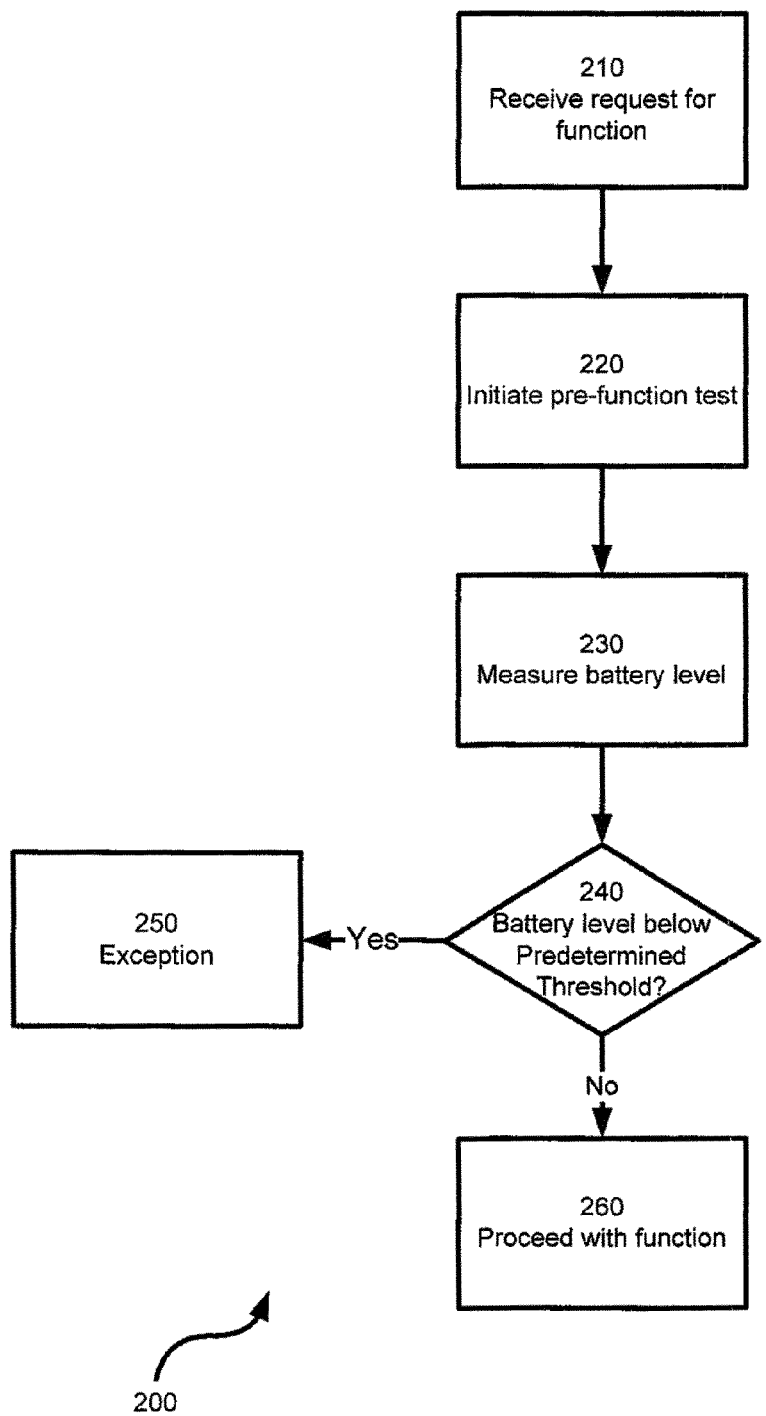
FIG. 4 shows a flow-chart depicting a method of power management in accordance with an embodiment.

Referring now to FIG. 4 a method of power management in an electronic device is represented in a flow-chart and indicated generally at 200. To assist in understanding method 200, method 200 will be explained in terms of its performance using device 30 in the context of flash 50. However, it is to be understood that this explanation is not be construed in a limiting sense and that method 200 can be performed on other devices other than device 30, and/or that method 200 can be varied.

Beginning at step 210, a request for a function is received. On device 30, this step can be effected when processor 54 receives an input via keyboard 38 that the user desires to use the flash function in order take a flash picture and capture an image through lens 46.

Next, at step 220 a pre-function test is initiated. In a present example, the pre-function test is a pre-flash test. The scope of the pre-flash test is chosen based on the parameters of supervisor circuit 70 and flash 50, to be sure that the pre-flash test does not actually exceed the event thresholds of the supervisor circuit 70 and trigger one of the events in Table I.

Since, according to Table I, if the voltage of battery 66 drops below 3.1 volts for more than ten milliseconds device 30 will enter sleep mode, then the duration of the pre-flash test should be chosen to be much shorter than ten milliseconds so that the pre-flash test will not cause supervisor circuit 70 to cause device 30 to enter sleep mode. Thus, as an example, it can then be desired to establish a pre-flash test that fires flash 50 so that flash 50 will draw the full one ampere of current from battery 66, but at the same time only fire flash for a period of two milliseconds (or other period well less than ten milliseconds), so that the pre-flash test does not exceed the thresholds of supervisor circuit 70.

According to the above example, at step 220 flash 50 will be fired by processor 54 for a period of two milliseconds such that one ampere of power is drawn by flash 50 from battery 66 for a two millisecond period.

Next, method 200 will advance from step 220 to step 230 at which point the level of battery 66 will be measured. Again, the variables used in measuring battery 66 are not particularly limited, and can include any known measurements used for measuring battery 66, for example, voltage level, ESR. At step 240, a determination is made as to whether the level measured at step 230 is below a predetermined threshold.

If, at step 240, it is determined that the battery level is below the predefined threshold, then method 200 advances to step 250 where an exception occurs. The exception can simply be a message presented on display 42 to the effect that the battery level is too low in order to use flash 50, and flash 50 can then be disabled so that device 30 continues to otherwise function normally except that flash 50 is not available for use.

If, however, at step 240 it is determined that the battery level is not below the predefined threshold, then method 200 advances to step 260 at which point the selected function in device 30 proceeds to operate normally, which in this case is flash 50. In other words, at step 260, in the present example flash 50 would operate normally and a flash picture would be taken using the camera features of device 30.

Figure 5:
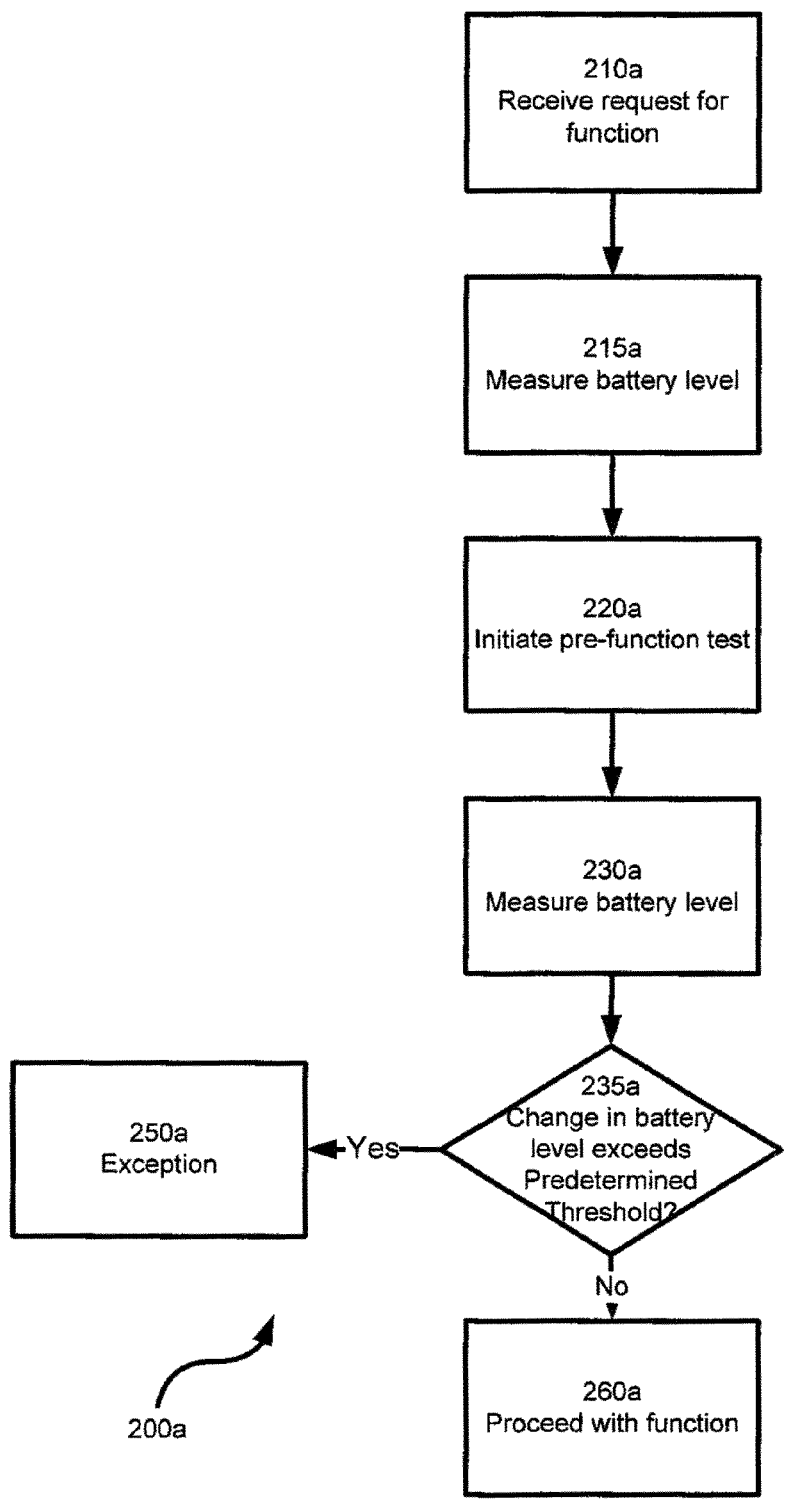
FIG. 5 shows a flow-chart depicting a method of power management in accordance with another embodiment.

It should be understood that method 200 can be varied. FIG. 5 shows an example of such a variation in the form of flow-chart depicting a method 200a Method 200a includes many of the same steps as method 200 and like steps include the same references except followed by the suffix "a". Of note, however, method 200a includes step 215a where the battery level is measured once before the pre-function test at step 220a, and then again after the pre-function test at step 230a. Also of note is that step 240 is replaced by step 235a, where a change in the battery levels as measured at step 215a and step 230a is examined, and based on this change a determination is made as to whether to proceed, or not, with the full camera flash. For example, if it was determined at step 235a that the voltage of battery 66 dropped a predefined amount then step 235a would advance to step 250a and an exception would be generated.

As still further variation, a time-varying voltage (and/or amperage and/or other battery level measurement) profile could be captured during the entire performance of step 220a. In turn, that profile can be compared with known profiles that predict whether a full duration flash would exceed the threshold parameters of supervisor circuit 70.

It should be understood that method 200 and/or method 200a and/or variants thereof can be directly incorporated into supervisor circuit 70.

Figure 6:
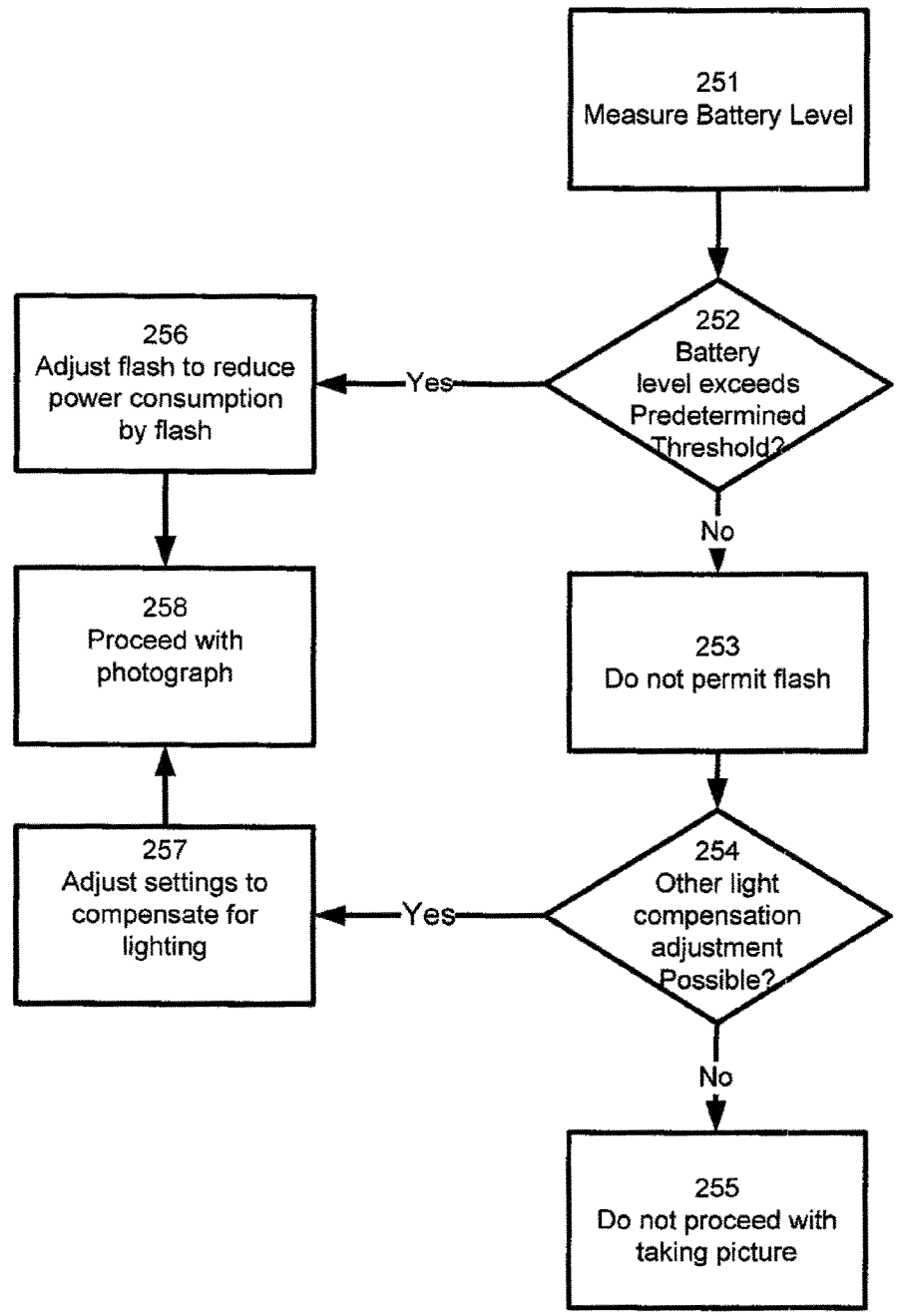
FIG. 6 shows a flow-chart depicting a method of managing power in a camera when a battery level cannot sustain a full flash.

It is to be reiterated that the foregoing embodiments are merely exemplary and variations, combinations and/or subsets of the embodiments discussed herein, and/or other embodiments not expressly discussed herein are contemplated. For example, while the previous embodiments contemplate that the exception at step 250 or step 250a would involve not permitting the flash to proceed, in other embodiments other exceptions could occur. FIG. 6 shows an exemplary set of steps that could be used to implement step 250 or step 250a. At step 251 the battery level is measured. At step 252, a determination is made if the battery level exceeds a predetermined threshold. If the response at step 252 is "No", then at step 253 a flash photograph is not permitted. At step 254 a determination is made as to whether other adjustments can be made that will compensate for the poor lighting that lead to the request for the use of the flash in the first place. The determination could be based upon whether decreasing the shutter speed, and/or increasing the aperture size of the lens and/or any other type of adjustment that can compensate for poor lighting conditions. If the response at step 252 is "No", then at step 255 the taking of the photograph is not permitted to proceed. If, however, the response at step 254 is "Yes", then at step 257 settings in the camera (such as shutter speed or aperture) are automatically adjusted to permit the photograph to be taken without a flash. At step 258 the photograph is taken.

Likewise, if the response at step 252 is "Yes", then at step 256 the flash settings are adjusted to reduce power consumption by flash 50 so as to not cause supervisor circuit 70 to shut down device 30. The exact settings for flash 50 at step 252 can be chosen so as to maximize the amount of light output from flash 50 but without tripping supervisor circuit 70.

It should now be understood that, in another variation, step 256 could also be performed in conjunction with step 257, so as to vary the settings of the camera (such as shutter speed and aperture) in conjunction with varying the output from flash 50 to capture a photograph with satisfactory lighting conditions which does not cause such a power drain on battery 66 so as to trip supervisor circuit 70.

Figure 7:
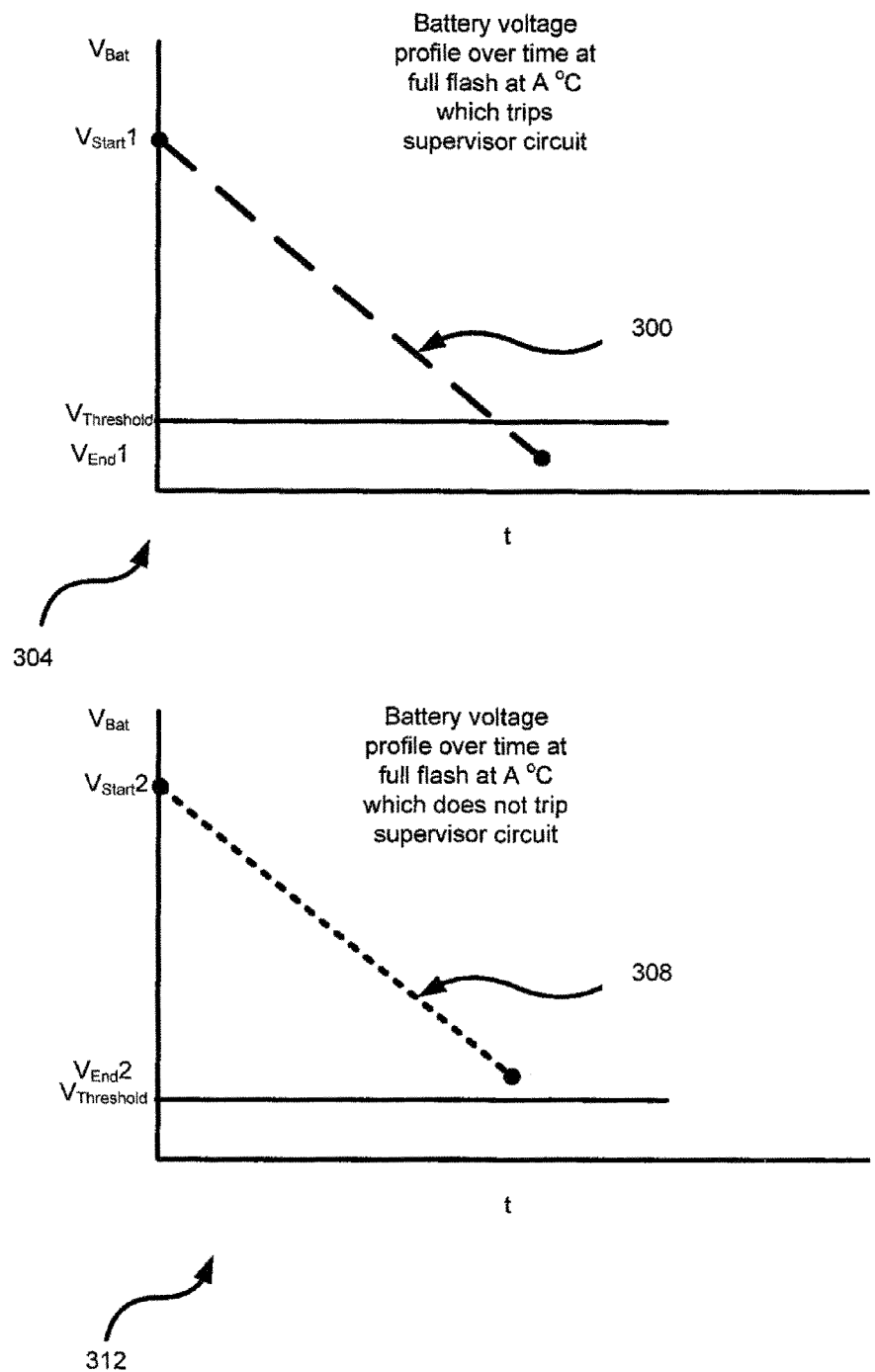
FIG. 7 shows exemplary voltage profiles of a battery when a flash is used at full power; and, FIG. 8 shows exemplary voltage profiles of pre-flash tests overlaid on the voltage profiles of FIG. 7.

It should now also be understood that the means by which steps 230 and 240 of method 200, and steps 215a, 230a and 235a of method 200a, and variations and combinations of each are not particularly limited. For example, FIG. 7 shows two exemplary voltage profiles 300 and 308. Voltage profile 300 is represented in the form of a graph 304, while voltage profile 308 is represented in the form of a graph 312.

Voltage profile 300 represents a profile that will cause supervisor circuit 70 to cause device 30 to enter sleep mode. Voltage profile 300 represents the drop in voltage of battery 66 from $V_{Start1}$ when the ambient temperature is about A° C. and flash 50 is used at its full setting, drawing about one ampere of power, over a full time period t of about 80 milliseconds.

In contrast voltage profile 300 represents a profile that will NOT cause supervisor circuit 70 to cause device 30 to enter sleep mode. Voltage profile 308 represents the drop in voltage of battery 66 from $V_{Start2}$ when the ambient temperature is about A° C. and flash 50 is used at its full setting, drawing about one ampere of power, over a full time period t of about 80 milliseconds.

Those skilled in the art will now recognize that profiles 300 and 308 are idealized for purposes of explanation, and that in practice such profiles are not necessarily linear.

Figure 8:
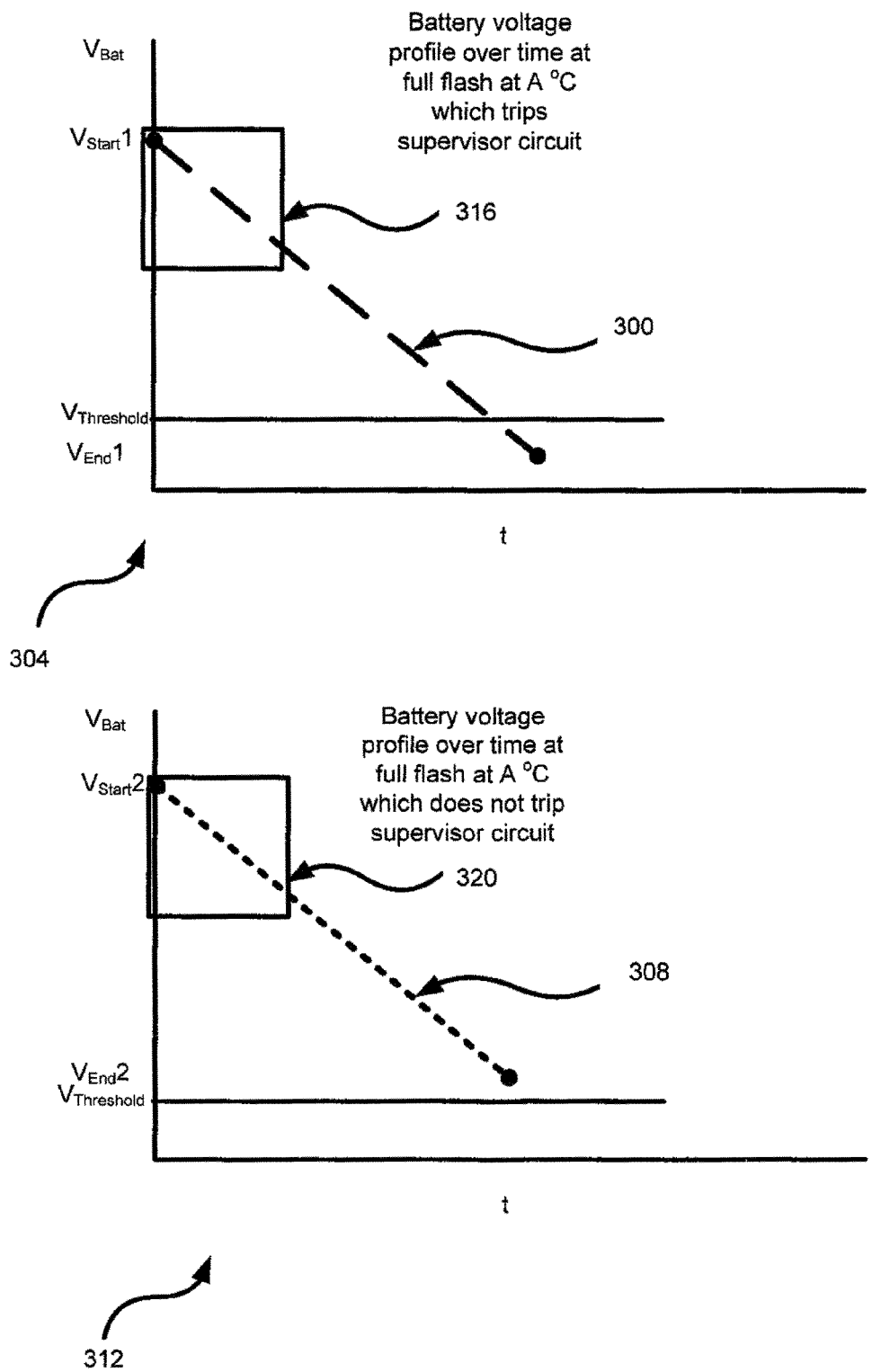

Numerous profiles (or representations thereof), such as profiles 300 and 308, can be gathered for different $V_{Start}$ voltages of battery 66 and different ambient temperatures A° C. An "average" version of profiles (such as profile 300 and 308) can be established by determining profiles for a number of substantially identical copies of device 30, so that variability between devices can be ascertained and considered when establishing profiles. (Such variability can include battery age, battery quality, and/or overall quality of all of the components that comprise device 30, and the manufacturing processes affecting the same. For example, some seemingly identical flash components like flash 50 will consume more power than others.) Referring now to FIG. 8, profiles 300 and 308 are reproduced, except that graph 304 includes a pre-function test profile 316, while graph 312 includes a pre-function test profile 320. Pre-function test profiles 316 and 320 are examples of the actual effect that step 220 or step 220a can have when performed on device 30. Thus, for example, when method 200 is performed and step 220 results in battery 66 exhibiting profile 316, then at step 240 it would be determined that the battery level is below the predetermined threshold and so method 200 would advance from step 240 to step 250. (At this point use of flash 50 may not be permitted, or the steps in FIG. 6 could be performed.) However, when method 200 is performed and step 220 results in battery 66 exhibiting profile 320, then at step 240 it would be determined that the battery level is NOT below a predetermined threshold and so method 200 would advance from step 240 to step 260.

The foregoing represents exemplary embodiments and is not intended to restrict the scope of the claims attached hereto.

An electronic device and method for power management in an electronic device is provided. In an embodiment, the electronic device includes the functionality of a personal digital assistant, wireless email paging and a camera with a flash that is operated via self-contained power supply in the form of a battery. The device also includes a supervisor circuit which causes the device to enter sleep mode, or disables the device, or certain features of the device, if the battery level falls below a certain threshold. A method in accordance with an embodiment performs, in response to a request to fire the flash, a pre-flash test which is selected so as to not trip the supervisor circuit. The battery level is examined as a consequence of performing the pre-flash test and, if the battery level as so examined meets certain criterion, then the full flash is not permitted to proceed. If the battery level does not meet the criterion, the full flash is not permitted to proceed. At this point the flash may not be permitted to flash altogether, or it can be permitted to flash at a lower brightness level, or flashed in some other manner so as to consume less power from the battery.

The invention claimed is:

1. A method of power management in an electronic device having a supervisor circuit for disabling all or a portion of functions of said electronic device if a first level of power to said electronic device falls below a predefined threshold, said method comprising:
   receiving a request for a function to be performed by said electronic device;
   determining a second level of power to said electronic device;
   performing a pre-function test; said pre-function test based on said function and selected to consume fewer power resources than said function and also selected to not to fall below said predefined threshold;
   determining a third level of power to said electronic device as a consequence of performing said pre-function test; and,
   if a difference between said second level of power and said third level of power meets a predefined criterion, preventing said electronic device from performing said function and otherwise permitting said electronic device to perform said function.

2. The method of claim 1 wherein said function is a camera flash.

3. The method of claim 2 wherein said flash is activated according to said function for a period of about eighty milliseconds and draws power of about one ampere; and wherein said flash is activated according to said pre-function test for a period of about two milliseconds and draws power of about one ampere.

4. The method of claim 1 wherein, in conjunction with preventing said electronic device from performing said function, generating an output signal from said electronic device indicating that there is insufficient power to perform said function.

5. The method of claims 1 wherein said power is provided via a rechargeable battery housed within said electronic device.

6. The method of claim 5 wherein at least one of said first level of power, said second level of power or said third level of power is measured using one or more of battery voltage, battery amperage, battery equivalent series resistance, and battery temperature.

7. The method of claim 1 further comprising measuring a plurality of additional levels of power throughout the performance of said pre-function test.

8. The method of claim 7 wherein said predefined criterion is based on changes within said additional levels of power.

9. The method claim 1 further comprising the step of, after preventing said electronic device from performing said function, permitting said electronic device to perform an alternative function that consumes less power than said function.

10. The method of claim 9 wherein said function is a camera flash used at full power and said alternative function is said camera flash used at less than full power.

11. The method of claim 9 wherein the alternative function is chosen to consume another level of power that is greater than said predefined threshold and differs from said predefined threshold by a value that approaches zero.

12. An electronic device comprising:
   a power supply;
   a supervisor circuit connected to said power supply for disabling all or a portion of functions of said electronic device if a first level of power from said power supply falls below a predefined threshold;
   a processor connected to said power supply and said supervisor circuit; said processor configured to receive a request via an input device for a function to be performed by said electronic device;
   an output device connected to said power supply, said processor, and said supervisor circuit, said output device configured to perform a function that draws power from said power supply;
   said processor configured to measure a second level of power from said power supply and then perform a pre-function test; said pre-function test based on said function and selected to consume fewer power resources than said function and also selected to not to fall below said predefined threshold;
   said processor further configured to determine a third level of power drawn from said power supply as a consequence of performing said pre-function test; and,
   said processor further configured to, if a difference between said second level of power and said third level of power meets a predefined criterion, prevent said output device from performing said function and otherwise permitting said output device to perform said function.

13. The electronic device of claim 12 wherein said output device is a camera flash.

14. The electronic device of claim 13 wherein said flash is activated according to said function for a period of about eighty milliseconds and draws power of about one ampere;

and wherein said flash is activated according to said pre-function test for a period of about two milliseconds and draws power of about one ampere.

15. The electronic device of claim 12 wherein, in conjunction with preventing said electronic device from performing said function, generating an output signal from said electronic device indicating that there is insufficient power to perform said function.

16. The electronic device of claim 12 wherein said power is provided via a rechargeable battery housed within said electronic device.

17. The electronic device of claim 12 wherein at least one of said first level of power, said second level of power or said third level of power is measured using one or more of battery voltage, battery amperage, battery equivalent series resistance, and battery temperature.

18. The electronic device claim 12 wherein said processor is configured to measure a plurality of additional power levels throughout the performance of said pre-function test.

19. The electronic device of claim 18 wherein said predefined criterion is based on changes within said additional levels of power.

20. The electronic device claim 12 wherein said processor is further configured to, after preventing said electronic device from performing said function, permitting said output device to perform an alternative function that consumes less power than said function.

21. The electronic device of claim 20 wherein said function is a camera flash used at full power and said alternative function is said camera flash used at less than full power.

22. The electronic device of claim 21 wherein the alternative function is chosen to consume another level of power that is greater than said predefined threshold and differs from said predefined threshold by a value that approaches zero.

23. An electronic device comprising:
a power supply;
a supervisor circuit connected to said power supply for disabling all or a portion of functions of said electronic device if a first level of power from said power supply falls below a predefined threshold,
a radio, said supervisor circuit configured to disable said radio when said power supply falls below about 3.4 Volts for at least about five milliseconds;
a processor connected to said power supply and said supervisor circuit; said processor configured to receive a request via an input device for a function to be performed by said electronic device;
an output device connected to said power supply, said processor, and said supervisor circuit, said output device configured to perform a function that draws power from said power supply;
said processor being configured to perform the steps of:
performing a pre-function test; said pre-function test based on said function and selected to consume less power than said function and also selected to not cause the first level of power to fall below said predefined threshold;
determining a second level of power to said electronic device as a consequence of performing said pre-function test; and,
if said second level of power meets at least one predefined criterion, preventing said electronic device from performing said function or otherwise permitting said electronic device to perform said function.

24. The electronic device of claim 23 wherein said output device is a camera flash.

25. The electronic device of claim 24 wherein said processor is configured to activate said flash according to said function for a period of about eighty milliseconds and draws current of about one ampere; and wherein said processor is configured to activate said flash according to said pre-function test for a period of about two milliseconds and draws current of about one ampere.

* * * * *